United States Patent [19]
Menon

[11] Patent Number: 6,010,653
[45] Date of Patent: *Jan. 4, 2000

[54] METHODS OF FABRICATING ELECTRODES FOR ELECTROCHEMICAL CELLS

[75] Inventor: Krishna Menon, Henderson, Nev.

[73] Assignee: Valence Technology, Inc., Henderson, Nev.

[ * ] Notice: This patent is subject to a terminal disclaimer.

[21] Appl. No.: 08/820,140

[22] Filed: Mar. 19, 1997

[51] Int. Cl.[7] .............................. B29C 41/12; H01M 2/16
[52] U.S. Cl. ........................ 264/105; 29/623.4; 156/308.6
[58] Field of Search ........................ 29/623.4; 156/308.6, 156/242; 264/104, 105, 299, 319

[56] References Cited

U.S. PATENT DOCUMENTS 5,286,339  2/1994  Klink ...................................... 29/623.4
5,435,874  7/1995  Takeuchi et al. ......................... 264/104
5,597,662  1/1997  Isaacson et al. ......................... 29/623.4
5,681,357  10/1997 Eschsach et al. ........................ 29/623.4
5,778,515  7/1998  Menon .................................... 28/623.4

*Primary Examiner*—Angela Ortiz
*Attorney, Agent, or Firm*—Young & Basile, P.C.

[57] ABSTRACT

Improved adhesion of an electrode layer with an electrolyte or separator layer can be achieved by substantially preventing polymer binder and plasticizer from absorbing into the substrate. This is achieved by impregnating the substrate with polymer and plasticizer prior to applying the electrode mixture which contains an electrode active material, polymer binder, plasticizer, and solvent onto the substrate. Alternatively, prior to applying the electrode mixture, a coating containing a mixture of polymer and plasticizer is applied unto the substrate to form a coated substrate wherein the coating is substantially pervious to solvent and is substantially impervious to said polymer and plasticizer.

19 Claims, 1 Drawing Sheet

METHODS OF FABRICATING ELECTRODES FOR ELECTROCHEMICAL CELLS

FIELD OF THE INVENTION

The present invention relates to electrochemical devices and, more particularly, to methods of fabricating electrodes films demonstrating improved lamination to the solid electrolyte or separator layer.

BACKGROUND OF THE INVENTION

Electrochemical cells comprise a cathode, an anode and an electrolyte interposed therebetween. The electrochemical cells are often defined as liquid or solid cells and this refers merely to whether the electrolyte interposed between the anode and the cathode is a liquid or a solid. Solid electrochemical cells are well known in the art and present many advantages over conventional liquid batteries such as improved safety features, lighter weight, etc. Non-aqueous lithium electrochemical cells are discussed in U.S. Pat. Nos. 4,472,487, 4,668,595, 5,028,500, 5,441,830, 5,460,904 and 5,540,741.

The anode comprises a compatible anodic material which is any material which functions as an anode in an electrochemical cell. Such compatible anodic materials are well known in the art and include, by way of example, lithium, lithium alloys, such as alloys of lithium with aluminum, mercury, nickel, zinc, and the like, and intercalation based anodes such as carbon, $WO_3$, and the like.

The cathode comprises a compatible cathodic material which refers to any material which functions as a positive pole (cathode) in an electrochemical cell. Such compatible cathodic materials are well known in the art and include, by way of example, manganese dioxide, molybdenum trioxide, sulfides of titanium and niobium, chromium oxide, copper oxide, vanadium oxides such as $V_2O_5$, $V_6O_{13}$, $LiV_3O_8$ and the like. The particular compatible cathodic material employed is not critical. When the electrochemical cell is a secondary cell, then the compatible cathodic material employed is one which is capable of being recharged (e.g., $LiV_3O_8$, $V_6O_{13}$, $MoO_3$, and the like).

Composite electrode refers to cathodes and anodes wherein the cathode is comprised of materials other than compatible cathodic materials and the anode is comprised of materials other than compatible anodic materials. Typically, the composite electrode contains a polymer which acts to bind the composite materials together and an electrolytic solvent. Composite electrodes are well known in the art. For example, a composite cathode can comprise a compatible cathodic material, a conductive material, an electrolytic solvent, an alkali salt, and a solid matrix forming polymer. Similarly, for example, a composite anode can comprise a compatible intercalation anodic material, an electrolytic solvent and a solid matrix forming polymer.

When fabricating electrochemical cells comprising composite electrodes, the anode is typically prepared by applying an anode mixture comprising a polymer, an anodic material and a carrier solvent to a substrate and then allowing the carrier solvent to evaporate or "air dry" to form an anode film. The anode film is then laminated onto a current collector to form the anode. Alternatively, the anode mixture can be applied directly to a current collector and the carrier solvent allowed to evaporate to form the anode. The cathode is typically prepared in a similar manner from a cathode mixture comprising a polymer, a cathode active material and a carrier solvent.

Although this method of preparing electrodes has been satisfactory, nevertheless, electrode films made by this process often do not adhere well to the current collector, solid electrolyte or separator layer upon lamination. Accordingly, the art is in search of improved techniques of fabricating electrode films that demonstrate superior adhesion.

SUMMARY OF THE INVENTION

The present invention is based in part on the discovery that improved adhesion of an electrode layer to the solid electrolyte or separator layer can be achieved by substantially reducing or eliminating the amount of polymer binder and plasticizer that is absorbed into the substrate unto which the electrode mixture containing the electrode active material, polymer binder, plasticizer and solvent is applied.

In one aspect, the invention is directed to a method of preparing an electrode that includes the steps of:
  forming an electrode mixture comprising a polymer, an electrode active material, a solvent, and a plasticizer;
  applying a layer of the electrode mixture onto a substrate which is made of material that is pervious to the solvent to form a coated substrate, wherein the substrate is impregnated with polymer and plasticizer;
  evaporating the solvent from the layer of electrode mixture to form an electrode film; and
  separating the film from the substrate.

In another aspect, the invention is directed to a method of preparing an electrode that includes the steps of:
  forming an electrode mixture comprising a polymer, an electrode active material, a solvent, and a plasticizer;
  coating a first layer comprising a mixture of the polymer and the plasticizer onto a substrate to form a coated substrate wherein said first layer is substantially pervious to said solvent and is substantially impervious to said polymer and plasticizer;
  applying a second layer comprising said electrode mixture onto said first layer;
  evaporating the solvent from the second layer to form an electrode film; and
  separating the electrode film from the coated substrate.

In yet another aspect, the invention is directed to a method of fabricating an electrochemical cell including an anode, a cathode, and a polymeric electrolyte layer positioned between the anode and the cathode which includes the steps of:
  (a) preparing an anode by a process that comprises the steps of:
    (i) forming an anode mixture comprising a first polymer, an anode active material, a first solvent, and a first plasticizer;
    (ii) applying a layer of the anode mixture onto a first substrate which is made of material that is pervious to the first solvent to form a first coated substrate, wherein the substrate is impregnated with first polymer and first plasticizer;
    (iii) evaporating the first solvent from the layer of anode mixture to form an anode film; and
    (iv) separating the anode film from the first substrate;
  (b) preparing a cathode by a process that comprises the steps of:
    (i) forming a cathode mixture comprising a second polymer, a cathode active material, a second solvent, and a second plasticizer;
    (ii) applying a layer of the cathode mixture onto a second substrate which is made of material that is pervious to the second solvent to form a second coated substrate, wherein the substrate is impregnated with second polymer and second plasticizer; and (iii) evaporating the second solvent from the layer of cathode mixture to form a cathode film; and (c) positioning a polymer layer between the anode film and the cathode film and laminating the polymer layer, the anode film, and the cathode film to form the electrochemical cell.

In a further aspect, the invention is directed to a method of fabricating an electrochemical cell including an anode, a cathode, and a polymeric electrolyte layer positioned between the anode and the cathode which includes the steps of:

(a) preparing an anode by a process that comprises the steps of:
(i) forming an anode mixture comprising a first polymer, an anode active material, a first solvent, and a first plasticizer;
(ii) coating a first layer comprising a mixture of first polymer and first plasticizer onto a first substrate to formed a first coated substrate wherein said first layer is substantially pervious to said first solvent and is substantially impervious to said first polymer and first plasticize;
(iii) applying a second layer comprising said anode mixture onto said first layer;
(iv) evaporating the first solvent from the second layer to form an anode film; and
(v) separating the anode film from the first coated substrate;

(b) preparing a cathode by a process that comprises the steps of:
(i) forming a cathode mixture comprising a second polymer, a cathode active material, a second solvent, and a second plasticizer;
(ii) coating a third layer comprising a mixture of second polymer and second plasticizer onto a second substrate to formed a second coated substrate wherein said second layer is substantially pervious to said second solvent and is substantially impervious to said second polymer and second plasticizer;
(iii) applying a fourth layer comprising said cathode mixture onto said third layer;
(iv) evaporating the second solvent from the fourth layer to form a cathode film; and
(v) separating the cathode film from the second substrate; and (c) positioning a polymer layer between the anode film and the cathode film and laminating the polymer layer, the anode film, and the cathode film to form the electrochemical cell.

In a preferred embodiment, the anode active material is an intercalation carbon material selected from the group consisting of graphite, coke, mesocarbon, and mixtures thereof and the cathode active material is selected from lithiated manganese oxides, lithiated cobalt oxides, lithiated nickel oxides and mixtures thereof. Preferably, the solvent comprises acetone, the polymer comprises a copolymer of vinylidenedifluoride and hexafluorpropylene, and substrate comprise paper.

A benefit of the invention is that anode and cathode bicells do not need to be sprayed with a polymer binder in order to be laminated with an electrolyte or separator layer.

DETAILED DESCRIPTION OF THE PREFERRED EMBODIMENTS OF THE INVENTION

Figure 1:
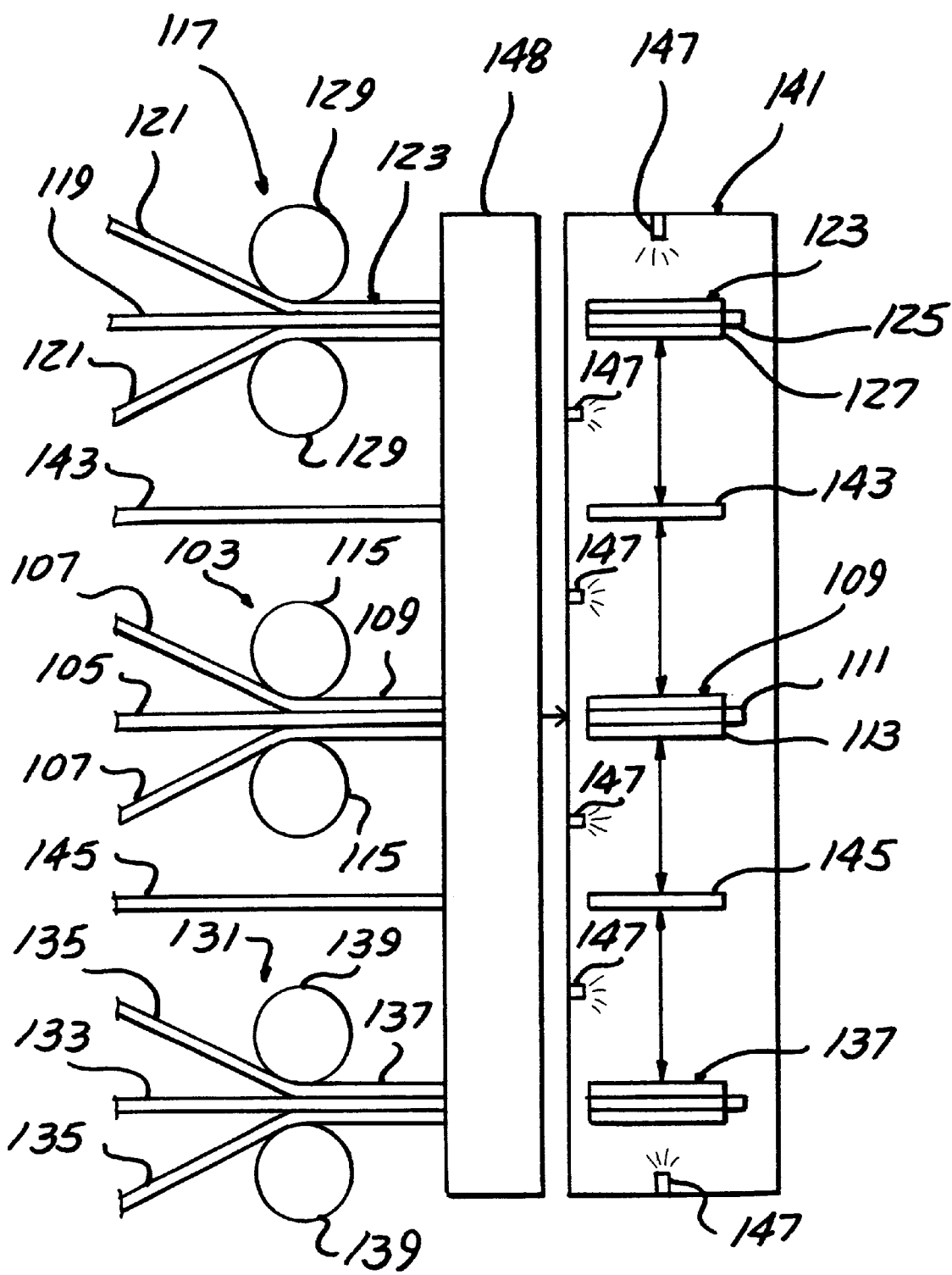
FIG. 1 is a schematic view of an embodiment of an apparatus for preparing an electrochemical cell.

The present invention is directed to a method of preparing composite electrodes suitable for use in electrochemical devices, and particularly for use in electrochemical cells and batteries.

Preferred electrochemical cells include: a composite cathode comprising an active material and polymeric binder, a composite anode comprising an intercalation based carbon anode and polymeric binder, with each electrode capable of reversibly incorporating (e.g., intercalating) an alkali metal ion, and an electrolyte comprising a polymeric matrix containing an electrolyte solution comprising an organic electrolyte solvent and a salt of the alkali metal. At least one of the composite electrodes has a current collector that is coated with a layer of an electrically conductive polymeric adhesive material that is positioned between the composite electrode and current collector. Preferably, both composite electrodes are so constructed. The layer of electrically conductive polymeric adhesive material significantly improves the adhesion of the current collector to the composite electrode which results in a reduction in the impedance for the electrochemical cell and battery. The composite electrode remains substantially and permanently attached to the layer of electrically conductive polymeric adhesive material during the life of the electrochemical cell or battery. Particularly preferred electrochemical cells and batteries use lithium and salts thereof.

The anode of the present invention generally comprises an anode film that is laminated onto one or both sides of the current collector. Typically, each anode film is from about 100 $\mu$m to about 250 $\mu$m in thickness, preferably about 110 $\mu$m to about 200 $\mu$m, and more preferably about 125 $\mu$m to about 175 $\mu$m. Similarly, the cathode of the present invention generally comprises a cathode film that is laminated onto one or both sides of the current collector. Typically, each cathode film is from about 100 $\mu$m to about 200 $\mu$m in thickness, preferably about 130 $\mu$m to about 175 $\mu$m, and more preferably about 140 $\mu$m to about 165 $\mu$m.

The current collectors comprise, for example, a screen, grid, expanded metal, foil, woven or non-woven fabric or knitted wire formed from an electron conductive material such as metals or metal alloys. The term "current collector" refers to any suitable metallic current collector. Current collectors in the form of grids are preferred. Preferably, the current collector has a thickness from about 25 $\mu$m to about 75 $\mu$m, preferably about 35 $\mu$m to about 65 $\mu$m, and more preferably about 45 $\mu$m to about 55 $\mu$m. Each current collector is also preferably connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

A critical aspect of the present invention is that in preparing the anode or cathode, the electrode mixture comprising an electrode active material, polymer binder, plasticizer, and solvent is applied onto a substrate, e.g., paper, that has been either: (1) precoated with a layer of polymer and plasticizer, or (2) impregnated with the polymer and plasticizer.

However, prior to describing this invention in further detail, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C.

A number of criteria are important in the choice of plasticizer including compatibility with the components of the electrochemical cell precursor, processability, low polymer solubility and extractability by dense gases. Preferred plasticizers include, for example, dibutyl phthalate, dioctylphthalate, acetates, glymes, and low molecular weight polymers.

In operation, in fabricating a solid polymeric matrix and composite electrode that includes polymeric binders, for example, the plasticizer is first well mixed with a polymer. Preferably the weight ratio of plasticizer to polymer in this mixture is from about 0.1 to about 50, more preferably about 0.5 to about 25, and most preferably about 1 to about 10. Thereafter the plasticizer is removed by extraction and in the process the porous structure is formed.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and solid polymeric matrix. The anode and/or cathode may each include a current collector. For a liquid electrolytic cell, a separator made of any suitable material such as, for example, glass fiber, polyethylene, or polypropylene is employed instead of a solid polymeric matrix.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. Nos. 5,501, 921, 5,498,491, 5,491,039, 5,489,491, 5,482,795, 5,463,179, 5,419,984, 5,393,621, 5,358,620, 5,262,253, 5,346,787, 5,340,669, 5,300,375, 5,294,501, 5,262,253, and 4,908,283, which are incorporated herein. Inorganic monomers are disclosed in U.S. Pat. Nos. 4,247,499, 4,388,385, 4,414,607, 4,394,280, 4,432,891, 4,539,276, and 4,557,985, which are incorporated herein.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidene difluoride and hexafluoropropylene dissolved in acetone or other suitable solvent. Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. For example, the organic carbonate can be non-cyclic carbonates or cyclic aliphatic carbonates. Non-cyclic carbonates include, for example, dimethyl carbonate, diethyl carbonate, methyl ethyl carbonate, dipropyl carbonate and bis(2-methoxyethyl) carbonate.

Suitable cyclic aliphatic carbonates for use in this invention include 1,3-dioxolan-2-one (ethylene carbonate);

4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethy-l-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-$\alpha,\beta$-diol (dihydroxy alkanes having hydroxyl substituents on adjacent carbon atoms) or an alkane-$\alpha,\gamma$-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-$\alpha,\beta$-diol or an alkane-$\alpha,\gamma$-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The composite anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), (including copolymers thereof), EAA (ethylene acrylic acid copolymer), EVA (ethylene vinyl acetate copolymer), EAA/EVA copolymers, and the like.

Composite anodes of the present invention preferably comprise a carbon material and a polymeric binder which preferably comprises polymers such as, for example, polyvinylidene difluoride, halogenated hydrocarbon polymers including, for example, poly(vinylidene chloride), poly((dichloro-1,4-phenylene) ethylene), fluorinated urethanes, fluorinated epoxides, fluorinated acrylics, and copolymers thereof. Porous polymer structures are formed when these polymers are first imbued with the plasticizers and then removing the plasticizers therefrom. The composite anode can comprise from about 5% (wt) to about 50% (wt) preferably from about 8% (wt) to about 30% (wt) and more preferably from about 10% (wt) to about 20% (wt) of the polymeric binders. Graphite is a preferred carbon material. The composite anode may also include an electron conducting material such as carbon black.

The composite cathode typically comprises a compatible cathodic material (i.e., insertion compounds) which is any material which functions as a positive pole in a solid electrolytic cell. Such compatible cathodic materials are well known in the art and include, by way of example, transition polymeric adhesive materials, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$ and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide material selected from $Li_xNiO_2$ and $Li_xCoO_2$ wherein $0<x\leq2$. Blends can also include $Li_y\text{-}\alpha\text{-}MnO_2$ ($0\leq y<1$) that has a hollandite-type structure and is described in U.S. Pat. No. 5,561,007, which is incorporated herein.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the composite cathode is prepared from a composite cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like. Preferably, the composite cathode can comprise from about 3% (wt) to about 50% (wt), preferably from about 8% (wt) to about 30% (wt), and more preferably from about 10% (wt) to about 20% (wt) of the polymeric binder.

The composite cathode further comprises from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. An ion conducting amount of an inorganic ion salt may also be included. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent based on the total weight of the electrolyte; preferably from about 60 to about 80 weight percent; and even more preferably about 70 weight percent.

A solid electrolyte composition typically comprises from about 5 to about 30 weight percent of the solid polymeric matrix based on the total weight of the electrolyte; preferably from about 15 to about 25 weight percent.

In a preferred embodiment, the solid electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

Methodology

Electrochemical cells are known in the art. See, for example, U.S. Pat. Nos. 5,300,373, 5,316,556, 5,346,385, 5,262,253, 4,472,487, 4,668,595, 5,028,500, 5,584,893, and 5,746,781 1996, all of which are incorporated herein. The inventive method can be adapted to prepare anodes and cathodes suitable for prior art electrochemical devices. In preparing the anode or cathode, the inventive method employs a substrate, e.g., paper, that has been pretreated either by: (1) being precoated with a layer of polymer and plasticizer, or (2) being impregnated with the polymer and plasticizer. The term "substrate" refers to any suitable film made of material that is compatible with components of the anode and cathode. The substrate serves as the vehicle or base onto which an anode or cathode slurry is applied. After the solvent has evaporated from the slurry, an anode or cathode film is formed. The substrate is separated from the electrode film before the film is laminated with a polymeric electrolyte or separator layer. Paper, e.g, 20 or 24 weight paper, is a preferred substrate. Other substrates include, for example, films fabricated from polyesters and other polymers.

It has been demonstrated that conventional methods of preparing electrodes, wherein the electrode slurry is applied on an untreated substrate, produce electrode films that do not adhere well to the electrolyte or separator layer. It was found that the polymer and plasticizer (in addition to the solvent) of the electrode slurry migrated by capillary action into the untreated substrate. The result was that the amount of polymer and plasticizer in the electrode film was less than expected. By pretreating the substrate, capillary action with respect to the polymer and plasticizer can be effectively eliminated although the solvent (e.g., acetone) can still permeate through the substrate and be removed from the electrode slurry.

Pretreatment is accomplished through precoating or impregnation. With the former, a mixture comprising about 3%–15% polymer binder (e.g., copolymer of VDF and HFP), about 5%–20% plasticizer (e.g., dibutyl phthalate), and the balance solvent (e.g., acetone) and having a viscosity of about 50 cps–500 cps is formed. The mixture is coated onto the substrate surface to form a layer that is preferably about 2 $\mu$m–5 $\mu$m thick. A thin film of the polymer and plasticizer is formed upon evaporation of the solvent. The film functions as a barrier to resist the capillary action of the substrate that would otherwise incorporate the polymer and plasticizer into the substrate.

The substrate can be precoated or impregnated by standard coating methods that employ, for example, a slot die, doctor blade, coma bar, or Meyer rod. Impregnation is achieved when the viscosity of the polymer mixture comprising the polymer binder, plasticizer, and solvent is sufficiently low to permit the mixture to readily permeate into the substrate. The preferred method of coating the substrate is with the Meyer rod which can form thin coatings having a thickness of a few microns. Excessive coating thickness is to be avoided since that increases cost and reduces its permeability to solvent. It was demonstrated using Simpson 20 weight paper that precoated paper or impregnated paper can be formed by varying the viscosity, e.g., solids level, of the polymer mixture. Specifically, the pre-coat composition comprised (1) Kynar 9.87% (polymer), (2) dibutyl phthalate 19.13% (plasticizer) and (2) acetone (solvent), comprising the balance. The viscosity ranged from 500–1000 cps at 20 RPM Brookfield viscometer (40–45s with #2 zone cup) depending on the amount of solvent. Using a Meyer rod, precoats having thicknesses of a few microns were formed when the solids content was about 28.5%. Impregnated paper was formed when the solids level was about 20%.

The following examples illustrate methods of how an electrolytic cell could be fabricated with the inventive process. Examples 1 and 2 describe the process of preparing the anode and cathodes, respectively. Example 3 describes the procedures for fabricating a solid electrolytic cell.

EXAMPLE 1

The anode current collector employed was a sheet of expanded copper metal that is about 50 $\mu$m thick. It is available under the designation Delker #2 Cu5-125 (flatten) Delker Corp., Branford, Conn. Both surfaces of the anode current collector are coated with an anode layer that is formed from an anode slurry that is applied to a substrate (e.g., paper) that has been pretreated as described above. The anode slurry is prepared as follows:

A polymer mixture comprising a copolymer of vinylidene difluoride (VDF) and hexafluoropropylene (HFP) is prepared by mixing 23.3 grams of the copolymer in 100 ml of acetone. The copolymer (ave. melt viscosity 23,000–27,000 poise) is Kynar Flex 2801™ from Elf Atochem North America, Philadelphia, Pa. The mixture is stirred for about 24 hours in a milling jar available from VWR Scientific, San Francisco, Calif., catalogue No. H-04172-00. The copolymer functions as a binder for the carbon in the anode.

A graphite mixture is prepared separately by first adding 80 grams of graphite into 3.1 grams of carbon black into a solution containing 200 grams acetone, 36 grams dibutyl phthalate, and 0.5 grams of a surfactant. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M. M. M. Carbon, Willbroeck, Belgium. The graphite mixture is then vigorously mixed in a high shear mixer until a substantially homogeneous blend is formed. A suitable mixer is available from Ross, Model ME100DLX, Hauppauge, N.Y. operating at a high setting (about 10,000 RPM) for 30 minutes.

The anode slurry is prepared by mixing the polymer mixture and the graphite mixture together under low shear conditions to form the anode slurry wherein the components are well mixed. A portion of the acetone is allowed to evaporate from the slurry before it was laminated onto the pretreated substrate. An anode film forms when the remaining portion of the acetone evaporates.

EXAMPLE 2

The cathode current collector employed is a sheet of expanded aluminum that is about 50 $\mu$m thick. The aluminum grid is available under the designation 2AL5-077 from Delker Corp. Both surfaces of the cathode current collector are coated with a cathode layer that is applied to a pretreated substrate. The cathode slurry is prepared as follows:

A polymer mixture comprising a copolymer of vinylidene difluoride (VDF) and hexafluoropropylene (HFP) is prepared by mixing 26.7 grams of the copolymer in 100 grams of acetone. The copolymer is Kynar Flex 2801™. The mixture is stirred for about 24 hours in a milling jar.

A cathode active material mixture is prepared separately by first adding 173.4 grams of a cathode-active material of $Li_xMn_2O_4$ (spinel) ($0<x\leq2$), 14.7 grams of carbon black (Super P™) into a solution containing 333.3 grams acetone, 51.9 grams dibutyl phthalate, and 0.9 grams of a surfactant. The mixture is then vigorously mixed in the a high shear mixer until a substantially homogeneous blend is formed.

A cathode slurry is prepared by mixing the polymer mixture and the cathode active material mixture together under low shear conditions to form the cathode slurry wherein the components are well mixed. A portion of the acetone is allowed to evaporate from the slurry before it is laminated onto the pretreated substrate. A cathode film forms when the remaining portion of the acetone evaporates.

EXAMPLE 3

A solid electrochemical cell is prepared by first positioning a polymeric matrix between the anode and cathode bicell structures fabricated in Examples 1 and 2, respectively, and thereafter fusing the structures under moderate pressure and temperature to form an electrochemical cell precursor. The polymeric matrix is formed by casting a polymeric slurry comprising acetone, dibutyl phthalate, silanized fumed $SiO_2$, and the VDF/HFP copolymer on a suitable substrate or carrier web and allowing the acetone to evaporate.

FIG. 1 illustrates an apparatus 101, for preparing an electrochemical cell, that includes a first laminating station 103. At the first laminating station 103, an anode current collector 105 is laminated to at least one anode material film 107 on at least one side of the anode current collector, and, more preferably, is laminated to anode material film 107 on both sides of the anode current collector, to form an anode precursor 109. The anode current collector 105 preferably includes an extending anode tab 111 extending past an edge 113 of the anode film, and the anode material film preferably includes, as discussed above, a first polymer, an intercalation carbon material, and a first plasticizer. The anode tab 111 may be provided by, for example, laminating the anode material film 107 over less than a complete width of the anode current collector 105. The first laminating station 103 preferably includes compressive elements such as nip rollers 115 for continuously laminating the anode current collector 105 to the anode material film or films 107, or compressive elements such as platens for intermittently laminating the anode current collector and the anode material film or films.

The apparatus 101 includes a second laminating station 117, similar to the first laminating station 103. At the second laminating station 117, a cathode current collector 119 is laminated to at least one cathode material film 121 on at least one side of the cathode current collector, is laminated to cathode material film on both sides of the cathode current collector, to form a cathode precursor 123. The cathode current collector 119 includes an extending cathode tab 125 extending past an edge 127 of the cathode material film 121, and the cathode material film includes a second polymer, a cathode active material, and a second plasticizer. The cathode tab 125 may be formed in the same manner as the anode tab 111. As with the first laminating station 103, nip rollers 129 or platens or other suitable compressive elements are provided at the second laminating station 117 for laminating the cathode current collector 119 and the cathode material film 121.

A third laminating station 131, identical to the second laminating station 117, is also provided. At the third laminating station 131, a second cathode current collector 133 laminated to at least one second cathode material film 135 on at least one side of the second cathode current collector, and is laminated to cathode material film on both sides of the second cathode current collector, to form a second cathode precursor 137. The second cathode precursor 137 is the same as the first cathode precursor, such that the second cathode material film 135 includes the second polymer, the cathode active material, and the second plasticizer. Like the first laminating station 103 and the second laminating station 117, the third laminating station 131 is provided with suitable compressive elements such as nip rollers 139 or platens or the like.

The anode precursors 109, the cathode precursors 123, and, if provided, the second cathode precursors 137 may, if desired or necessary, be prepared at a site remote from the site at which the remaining steps in the assembly of the electrochemical cell. The apparatus 101 is described as including the first, second, and third laminating stations 103, 117, and 131 by way of example, not of necessity.

The apparatus 101 includes an assembling station 141. At the assembling station 141, a polymeric layer 143 including a third plasticizer is interposed between the anode precursor 109 and the cathode precursor 123 such that the polymeric layer prevents direct contact between the anode current collector 105 and the cathode current collector 119. If a second cathode precursor 137 is provided, as is preferred, a second polymeric layer 145 is likewise interposed between the anode precursor 109 and the second cathode precursor, on a side of the anode precursor opposite the first cathode precursor 123.

At the assembling station 141, the anode precursor 109, the first polymeric layer 143, the cathode precursor 123, the second polymeric layer 145, and the second cathode precursor 137 are all sprayed, by one or more sprayers 147, with acetone or some other suitable material for softening the anode precursor, the first polymeric layer, the cathode precursor, the second polymeric layer, and the second cathode precursor sufficiently so that those elements adhere to one another and are not easily displaced relative to one another. The assembly of the polymeric layer, the anode precursor 109, and the cathode precursor 123 and, if provided, the second polymeric layer 145 and the second cathode precursor 137 is performed by a pick and place type of apparatus available from Klöckner Medipak, Clearwater, Fla. The anode precursor 109, the cathode precursor 123, and, if provided, the second cathode precursor 137, as well as the polymeric layer or layers, may be cut by a cutter 148 to a desired size corresponding to a desired amount of power desired and subsequently sprayed with acetone, or may be first sprayed with acetone and joined, and then cut to size. The polymeric layer does not have to be sprayed with a polymer binder in order to be laminated to the anode or cathode bicell. Following extraction of the plasticizer, the battery is activated.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method of preparing an electrode that comprises the steps of:

forming an electrode mixture comprising a polymer, an electrode active material, a solvent, and a plasticizer;

applying a layer of the electrode mixture onto a substrate which is made of material that is pervious to the solvent to form a coated substrate, wherein the substrate is impregnated with polymer and plasticizer;

evaporating the solvent from the layer of electrode mixture to form an electrode film; and separating the film from the substrate.

2. The method of claim 1 wherein the polymer is substantially homogeneously distributed within said electrode mixture.

3. The method of claim 1 wherein the electrode active material is an anode active material comprising an intercalation carbon material.

4. The method of claim 3 wherein the intercalation carbon material is selected from the group consisting of graphite, coke, mesocarbon, and mixtures thereof.

5. The method of claim 1 wherein the electrode active material is a cathode active material.

6. The method of claim 5 wherein the cathode active material is selected from lithiated manganese oxides, lithiated cobalt oxides, lithiated nickel oxides and mixtures thereof.

7. The method of claim 1 wherein the solvent is acetone.

8. The method of claim 1 wherein the polymer is a copolymer of vinylidenedifluoride and hexafluorpropylene.

9. The method of claim 1 wherein the substrate is made of paper.

10. The method of claim 1 wherein the weight ratio of polymer to plasticizer present in the substrate ranges from about 0.2 to 1 to about 4 to 1.

11. A method of preparing an electrode that comprises the steps of:

forming an electrode mixture comprising a polymer, an electrode active material, a solvent, and a plasticizer;

coating a first layer comprising a mixture of the polymer and the plasticizer onto a substrate to form a coated substrate wherein said first layer is substantially pervious to said solvent and is substantially impervious to said polymer and plasticizer;

applying a second layer comprising said electrode mixture onto said first layer;

evaporating the solvent from the second layer to form an electrode film; and separating the electrode film from the coated substrate.

12. The method of claim 11 wherein the polymer is substantially homogeneously distributed within said electrode mixture.

13. The method of claim 11 wherein the electrode active material is an anode active material comprising an intercalation carbon material.

14. The method of claim 13 wherein the intercalation carbon material is selected from the group consisting of graphite, coke, mesocarbon, and mixtures thereof.

15. The method of claim 11 wherein the electrode active material is a cathode active material.

16. The method of claim 11 wherein the cathode active material is selected from lithiated manganese oxides, lithiated cobalt oxides, lithiated nickel oxides and mixtures thereof.

17. The method of claim 11 wherein the solvent is acetone.

18. The method of claim 11 wherein the polymer is a copolymer of vinylidenedifluoride and hexafluorpropylene.

19. The method of claim 11 wherein the weight ratio of polymer to plasticizer in the first layer ranges from about 0.2 to 1 to about 4 to 1.

* * * * *